United States Patent [19]

Suzuki et al.

[11] Patent Number: 4,913,506

[45] Date of Patent: Apr. 3, 1990

[54] OPTICAL MODULATION DEVICE

[75] Inventors: Masatoshi Suzuki; Shigeyuki Akiba; Hideaki Tanaka, all of Tokyo; Katsuyuki Utaka, Musashino, all of Japan

[73] Assignee: Kokusai Denshin Denwa Kabushiki Kaisha, Tokyo, Japan

[21] Appl. No.: 311,218

[22] Filed: Feb. 16, 1989

[30] Foreign Application Priority Data

Feb. 26, 1988 [JP] Japan .................................. 63-42198
Feb. 26, 1988 [JP] Japan .................................. 63-42199
Feb. 26, 1988 [JP] Japan .................................. 63-42200

[51] Int. Cl.$^4$ ............................................. G02B 6/10
[52] U.S. Cl. ............................... 350/96.14; 350/96.12
[58] Field of Search ............... 350/96.12, 96.13, 96.14; 332/7.51

[56] References Cited

U.S. PATENT DOCUMENTS

| | | | |
|---|---|---|---|
| 3,695,745 | 10/1972 | Furukawa | 350/96.14 |
| 3,868,589 | 2/1975 | Wang | 350/96.12 X |
| 3,923,374 | 12/1975 | Martin | 350/96.14 |
| 4,685,763 | 8/1987 | Tada et al. | 350/96.14 |
| 4,767,169 | 8/1988 | Teng et al. | 350/96.14 |
| 4,837,526 | 6/1989 | Suzuki et al. | 350/96.14 X |

Primary Examiner—William L. Sikes
Assistant Examiner—Phan T. Heartney
Attorney, Agent, or Firm—Emmanuel J. Lobato; Robert E. Burns

[57] ABSTRACT

An optical modulation device is disclosed in which a difference between the photon energy of incident light and the band-gap energy of the modulation waveguide layer is set to a value greater than 50 meV to thereby suppress the degradation of the modulation voltage and the modulation band width which is caused by an increase in the intensity of incident light and in that the optical modulation device is formed in a predetermined length to thereby decrease the modulation voltage. The energy gap of the optical waveguide layer of the optical modulation device is varied continuously or discontinuously in the direction of its thickness to provide a constant absorption coefficient thickwise of the optical waveguide layer so that the electric field intensity distribution in the optical waveguide layer is compensated for, by which overlap of the light distribution and the absorption coefficient is increased so as to decrease the modulation voltage and broaden the modulation band by the reduction of the length of the device. The composition, thickness and stripe width of the optical waveguide layer are changed so that its absorption coefficient increases from the light receiving end face of the optical waveguide layer toward its light emitting end face, thereby making the number of carriers absorbed per unit length substantially constant in the direction of travel of light.

14 Claims, 8 Drawing Sheets

OPTICAL MODULATION DEVICE

BACKGROUND OF THE INVENTION

The present invention relates to an optical external modulation device for modulating incident light.

Fiber optic communication technology has been developed through utilization of the ultra-low loss property of optical fiber and the essential ultra-wide band property of light, and studies for longer distance and larger capacity transmission are now being made in many countries. Now that the transmission loss by optical fiber has reached a theoretical limit, studies for faster, larger capacity transmission are of particular importance.

For turning ON and OFF an optical signal at a high speed it is customary, at present, to employ a method which directly modulates a semiconductor laser. With the direct modulation system, however, since a current of the semiconductor laser which is an oscillation element is varied at a high speed, the oscillation wavelength undergoes substantial variations with time, resulting in the oscillation spectral width becoming abnormally large as compared with the spectral width in the modulation band. Accordingly, in long distance or high-speed transmission light pulses are subjected to a wavelength dispersion by the optical fiber and distorted light pulses are received, so that no excellent transmission characteristic can be obtained. As a solution to this problem there has recently been under study a method which holds the output of the semiconductor laser constant and modulates it by an external optical modulation device at a high speed.

As optical modulation devices there have been proposed an optical modulation device which utilizes a ferrodielectric substance such as LiNbO₃ and a semiconductor optical modulation device which can be monolithically integrated with a single-wavelength semiconductor laser such as a DFB laser. Of the conventional devices, the latter electroabsorption type optical modulation device is regarded as the most promising which applies an electric field to the modulation waveguide and performs an intensity modulation by an electroabsorption.

As described above, the conventional electroabsorption type optical modulation device is capable of the low-voltage modulation, the high-speed operation and the narrow-spectrum operation but is defective in that these characteristics will significantly be degraded when the incident light intensity is raised up to a practical level of several mW.

SUMMARY OF THE INVENTION

It is therefore an object of the present invention to provide an optical modulation device which permits high-speed modulation at a low voltage even if the intensity of incident light is above 0.1 mW by way of example.

The present invention possesses a first feature in that a difference between the photon energy of incident light and the band-gap energy of the modulation wveguide layer is set to a value greater than 50 meV to thereby suppress the degradation of the modulation voltage and the modulation band width which is caused by an increase in the intensity of incident light and in that the optical modulation device is formed in a predetermined length to thereby decrease the modulation voltage.

The present invention possesses a second feature in that the band-gap energy of the optical waveguide layer of the optical modulation device is varied continuously or discontinuously in the direction of its thickness to provide a constant absorption coefficient thickwise of the optical waveguide layer so that the electric field intensity distribution in the optical waveguide layer is compensated for, by which overlap of the light distribution and the absorption coefficient is increased so as to decrease the modulation voltage and broaden the modulation band by the reduction of the length of the device. At the same time, a space-charge effect by local excess carriers, which poses a problem when high intensity light is incident, is suppressed by the constant absorption coefficient throughout the optical waveguide layer, permitting high-speed modulation.

A third feature of the present invention resides in that the composition, thickness and stripe width of the optical waveguide layer are changed so that its absorption coefficient increases from the light receiving end face of the optical waveguide layer toward its light emitting end face, thereby making the number of carriers absorbed per unit length substantially constant in the direction of travel of light.

A fourth feature of the present invention resides in that the band-gap energy of the optical waveguide layer is varied continuously or discontinuously thicknessiwise thereof.

A fifth feature of the present invention resides in that the band gap energy of the optical waveguide layer is 50 meV or more greater than the photon energy of incident light.

BRIEF DESCRIPTION OF THE DRAWINGS

The present invention will be described in detail below in comparison with prior art with reference to accompanying drawings, in which.

DETAILED DESCRIPTION

To make differences between prior art and the present invention clear, an example of prior art will first be described.

Figure 1:
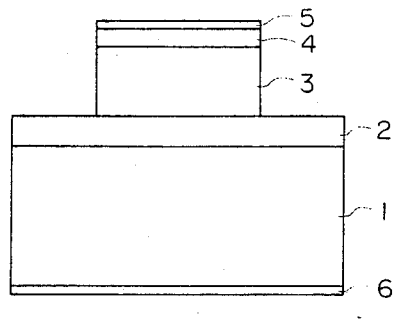
FIG. 1 is a sectional view showing an example of a conventional electroabsorption type optical modulation element.

FIG. 1 is a perspective view of the conventional electroabsorption type optical modulation device. An n⁻-InGaAsP modulation waveguide layer 2, a mesa-shaped p-type InP clad layer 3 and a p-type InGaAsP cap layer 4 are laminated on an n-type InP substrate 1, and a p-type electrode 5 and an n-type electrode 6 are formed in contact with the p-type InGaAsP cap layer 4 and the n-type InP substrate 1, respectively. With this optical modulation device, light is incident to the InGaAsP modulation waveguide layer 2 and minus and plus voltages which are applied to the p-type electrode 5 and the n-type electrode 6, respectively, are varied to cause a change in the absorption coefficient of the InGaAsP modulation waveguide 2, by which the intensity of emitted light can be modulated. It is important for the electroabsorption type optical modulation device to be capable of performing low-voltage modulation and high-speed modulation and suppressing the broadening of the spectrum during the high-speed modulation. It has been considered up to the present that the closer to the band-gap energy Eg of the InGaAsP modulation waveguide layer 2 the photon energy h$\nu$ of incident light is, the more greatly the absorption coefficient of the layer 2 can be varied at a low voltage and the more the element length L (the length of the InGaAsP modulation waveguide layer 2 from its light incident end face to its light emitting end face) can be reduced, permitting the high-speed modulation and suppressing the spectrum from broadening. Accordingly, the prior art has taken into account only an energy difference $\Delta$Eg (Eg−h$\nu$), and it has been considered that an optical modulation device of high performance could be obtained by setting the energy difference $\Delta$Eg to 30 to 40 meV. It has been found, however, that the conventional optical modulation device presents excellent characteristics in the modulation voltage, the modulation band width and the spectral width when the incident light intensity is below about 100 $\mu$W, but that as the incident light intensity exceeds 0.1 mW, the modulation voltage markedly rises and the band width also decreases.

With reference to the accompanying drawings, the present invention will hereinafter be described in detail in connection with the first feature thereof.

(Embodiment 1)

Figure 2:
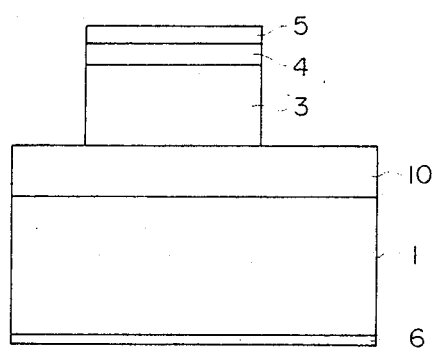
FIG. 2 is a sectional view of a first embodiment of the optical modulation element of the present invention.

FIG. 2 is a sectional view illustrating a first embodiment of the optical modulation device of the present invention.

This embodiment differs from the conventional structure in that the energy difference $\Delta$Eg(=Eg−h$\nu$) is set so that the band-gap energy Eg of an n⁻-InGaAsP optical waveguide layer 10 is 50 meV or more greater than the photon energy h$\nu$ of incident light, and in that the length L$_0$ of the optical modulation device is set to a value which satisfies the condition 10 meV/mm $\leq \Delta$Eg/L$_0 \leq$ 250 meV/mm.

Figure 3:
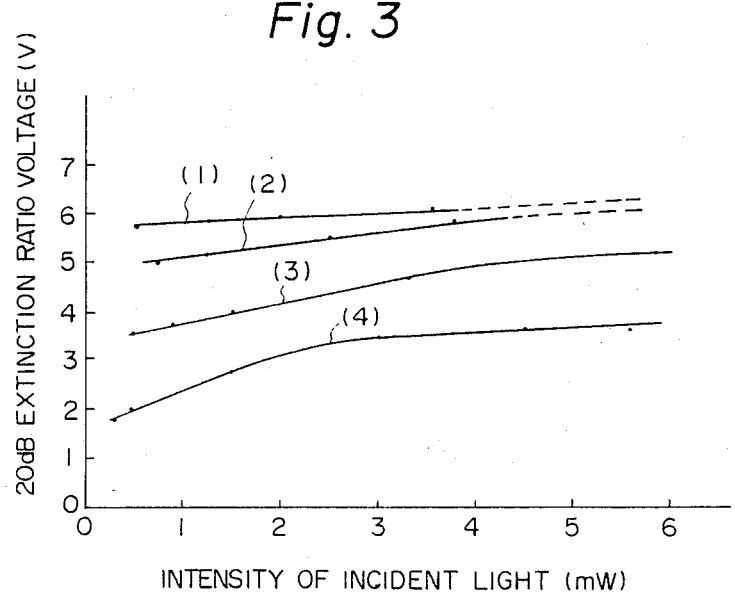
FIGS. 3, 4 and 5 are graphs showing the results of experiments on the optical modulation device of the present invention, for comparing it with the conventional optical modulation device in terms of their characteristics.
Figure 4:
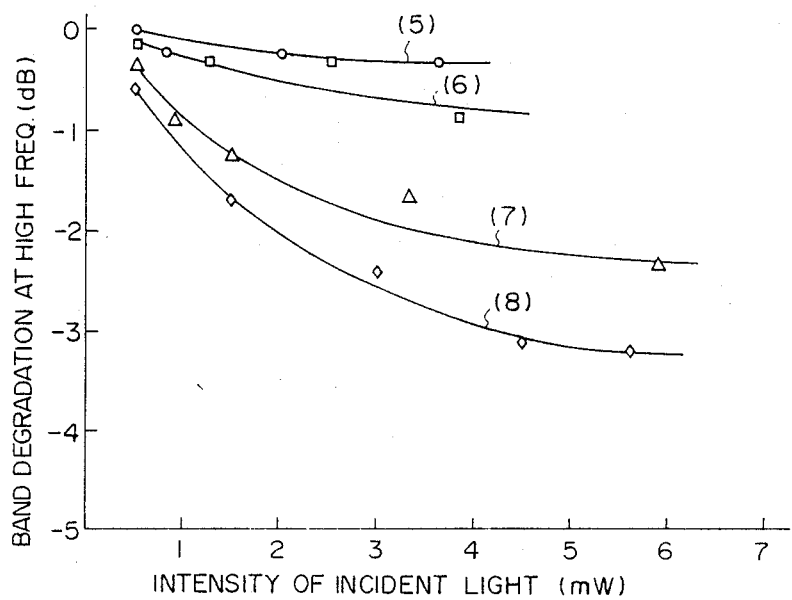
Figure 5:
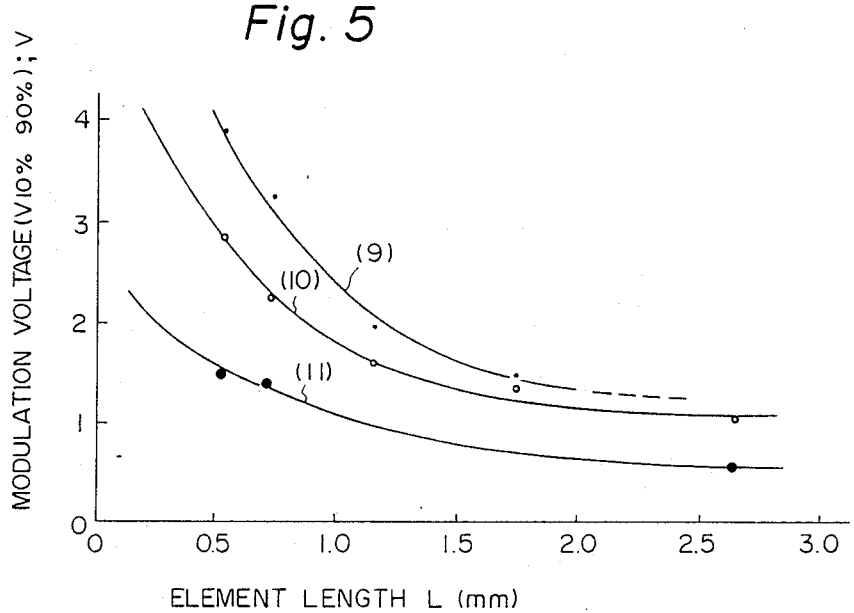

A description will be given first, with reference to FIGS. 3 and 4 showing the results of experiments on the present invention, of a problem which results from the energy difference $\Delta$Eg, then of the device length L$_0$ with regard to FIG. 5. In order to clearly show the difference between the present invention and the prior art, characteristic curves of this invention devices with energy differences $\Delta$Eg of 55 meV and 50 meV are marked with (1) and (2), respectively, and characteristic curves of prior art structures with energy differences $\Delta$Eg of 40 meV and 30 meV are marked with (3) and (4), respectively, in FIGS. 3 through 5.

A detailed description will be given first of the problem which arises from the energy difference $\Delta$Eg.

The present inventors examined how the characteristics of the optical modulation device in the case of the intensity of incident light being increased are affected by the energy difference $\Delta$Eg (=Eg−h$\nu$) between the photon energy h$\nu$ of incident light and the band-gap energy Eg of the modulation waveguide layer, using the conventional optical modulation device (FIG. 1) and the optical modulation device of the present invention (FIG. 2). As a result of their studies, it was found that the modulation voltage and the modulation band width in the case of $\Delta$Eg=30 to 40 meV present excellent characteristics when the incident light intensity is below about 0.1 mW but that as the incident light intensity increases up to several mW, the modulation voltage rises up to about twice as high and the modulation band width is markedly degraded as in the prior art example mentioned above.

FIG. 3 is a graph of the results of experiments on the present invention, showing the incident light intensity-20 dB extinction ratio voltage characteristics of a 520 $\mu$m long optical device which represent the incident light intensity dependence of a voltage value which provides an extinction ratio of 20 dB. In FIG. 3 the parameter $\Delta$Eg (curves (1) to (4)) is the energy difference $\Delta$Eg (Eg−h$\nu$) between the band-gap energy Eg of the InGaAsP optical modulation waveguide layers 10 and 2 and the photon energy h$\nu$ of incident light. In case of the conventional structure with $\Delta$Eg=30 meV (curve (4)) and 40 meV (curve (3)), the 20 dB extinction ratio voltage increased with an increase in the intensity of incident light and the modulation voltage would no longer increase after the incident light intensity reaches 3 to 4 mW. On the other hand, in case of this invention device with $\Delta$Eg=50 meV (curve (2)) and 55 meV (curve (1)), the modulation voltage increased substantially linearly. The linear increase in the modulation voltage is attributable to the fact that the voltage which is applied to the optical modulation element effectively decreases owing to a voltage drop across an ohmic resistance or the like by light photo-generated current. This is an essential property of the electroabsorption type optical modulation device. In contrast thereto, it is considered that the abrupt increase in the modulation voltage observed in the conventional device with the energy difference $\Delta$Eg in the range of 30 to 40 meV is due to the phenomenon that the band structure is distorted by excessively absorbed carriers, decreasing the intensity of the effective electric field which is applied to the optical waveguide.

FIG. 4 is a graph explanatory of the principle of the present invention, incident light intensity-band degradation characteristics which represent the incident light intensity dependence of frequency characteristic degradation at high frequencies, using the energy difference $\Delta$Eg as a parameter. In case of the conventional structure with the energy difference $\Delta$Eg in the range of 30 to 40 meV, a degradation of 2 to 3 dB was observed as the intensity of incident light increased, whereas in the device of the present invention with the energy difference $\Delta$Eg above 50 meV, the degradation was less than 1 dB. The degradation less than 1 dB is owing to a voltage drop across an ohmic resistance or terminating resistance which is caused by the photo-generated current as mentioned above, and this is also considered to be an essential property of the electroabsorption type optical modulation device. The degradation by $\Delta Eg=30$ to 40 meV is attributable to the phenomenon that the electric field which is applied to the waveguide is blocked by excessively absorbed carriers and does not faithfully trace the externally applied voltage owing to a space charge effect or the like.

In designing an optical modulation device with a modulation voltage of 2 V or so and a frequency band width of, for example, more than 5 GHz and with no practically broadening of spectrum, the energy difference $\Delta Eg$ of 30 to 40 meV and the device length of about 0.5 mm have been considered optimum, and such optical modulation devices have been manufactured. As will be evident from the above, however, FIGS. 3 and 4 clearly indicate that the energy difference $\Delta Eg$ (30 to 40 meV) poses the serious problem that both the modulation voltage and the modulation band width will significantly be degraded by an increase in the intensity of incident light.

next, a description will be given of the relationship of the device length $L_0$ to the modulation voltage and the frequency band width. FIG. 5 shows the results of experiments on the present invention, for explaining the device length dependence of the modulation voltage (a voltage for decreasing the light intensity from 90 to 0%) in a case where the intensity of incident light is 5 mW. It is possible with the present technology to set the modulation voltage to 4 V or so. FIG. 5 indicates that in the case where the energy difference $\Delta Eg$ is 50 meV (curve (2)) and 55 meV (curve (1)), desired results could be obtained by selecting the device length $L_0$ greater than 0.2 and 0.5 mm, respectively. Accordingly, a ratio $\Delta Eg/L$ at that time becomes 250 meV/mm and 110 meV/mm, and it is seen that the modulation voltage could be set to about 4 V if the upper limit of the ratio $\Delta Eg/L$ is 250 meV/mm.

The frequency band width is dependent primarily on the modulation waveguide width. Where the modulation waveguide width is 1 μm, the upper limit of the length which permits implementation of a band width greater than 5 GHz is approximately 5 mm. Accordingly, a condition $\Delta Eg/L \geq 10$ meV/mm must be satisfied for obtaining a high-speed optical modulator. Incidentally, as the modulation waveguide width increases, the ratio $\Delta Eg/L$ also increases, and when the modulation waveguide width is 5 μm, the ratio $\Delta Eg/L$ becomes 30 meV/mm.

As described above, $\Delta Eg \geq 50$ meV and 10 meV/mm $\leq \Delta Eg/L_0 \leq 250$ meV/mm are necessary conditions for obtaining an optical modulation device which has a modulation voltage below 4 V and a band width greater than 5 GHz. Accordingly, the present invention constitutes the optical modulation device so that the conditions of $\Delta Eg$ and $\Delta Eg/L_0$ are fulfilled.

(Embodiment 2)

Figure 6:
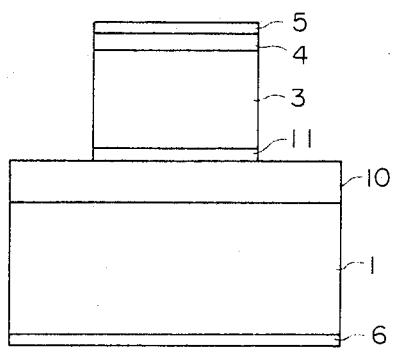
FIG. 6 is a sectional view of a second embodiment of the optical modulation device of the present invention.

FIG. 6 is a sectional view of a second embodiment of the optical modulation device of the present invention.

This embodiment differs from Embodiment 1 in that an n⁻-InP layer 11 of the same conductivity type as that of the n⁻-InGaAsP waveguide layer 10 and about 0.2 μm thick is sandwiched between the waveguide layer 10 and the p-InP layer 3 for the purpose of reducing an absorption loss by a built-in electric field. By selecting the length $L_0$ of the device and the width of the waveguide 1 mm and 5 μm, respectively, an extinction ratio of 10 dB can be obtained at a working voltage below 2 V, achieving a 3 dB band width of around 5 GHz. Further, since the optical modulation device of the present invention is designed so that $\Delta Eg \geq 50$ meV and $\Delta Eg/L=50$ meV/mm, an increase in the intensity of incident light will not practically increase the modulation voltage and decrease the modulation band width.

Although in the above the present invention has been described in connection with the case of using materials of the InGaAsP/InP systems, the invention is also applicable to other materials such as those of the AlGaAs/GaAs and the AlInGaAs/InP systems.

Moreover, it is also possible to employ a multiple quantum well layer formed of such materials, in which case the energy gap mentioned in the above is an effective energy gap determined by the quantum well level. While in the above the stripe structure for stabilizing the transverse mode has been described with regard to the strip loaded planar waveguide type, a buried stripe structure, a ridge waveguide stripe-structure and similar ones are all applicable.

As described above, according to the first feature of the present invention, the optical modulation device is designed so that the energy difference $\Delta Eg$ is 50 meV and the ratio $\Delta Eg/L_0$ is in the range of 10 to 250 meV/mm, so that even if the intensity of incident light increases up to the practical level several mW from of 0.1 mW, an increase in the modulation voltage and a decrease in the modulation band width are not substantially caused, permitting low-voltage, high-speed modulation. Besides, the absorption loss by the build-in electric field can be reduced by providing the InP layer 11 between the InGaAsP waveguide layer 10 and the p-InP layer 3. Accordingly, the optical modulation device of the present invention is applicable to ultra-high-speed fiber optic communication or the like and is of great utility.

With reference to the accompanying drawings, the present invention will hereinafter be described in detail in connection with the second feature thereof.

(Embodiment 3)

Figure 7:
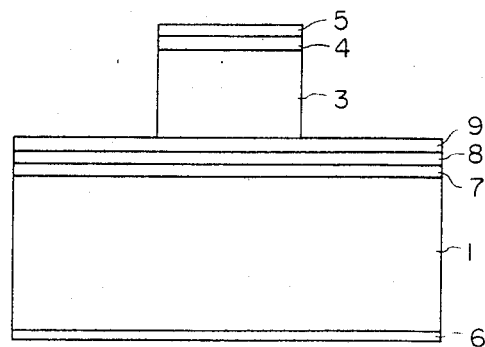
FIG. 7 is a sectional view illustrating a third embodiment of the optical modulation device of the present invention.

FIG. 7 is a sectional view of a third embodiment of the optical modulation device of the present invention.

The illustrated structure differs from the conventional structure in that the InGaAsP optical waveguide layer 2 is composed of three layers (7, 8, 9) of different band-gap energy.

In the prior art the carrier concentration of the n⁻-InGaAsP optical waveguide layer is $5 \times 10^{15}$ cm⁻³. This is substantially the lowest carrier concentration which is obtainable with the present crystal growth technique without intentional impurity doping. Even such a low carrier concentration will produce an electric field intensity difference of around 20 KV/cm between both ends of a 0.3 μm thick waveguide in the direction of its thickness. Since this difference in electric field intensity makes a large difference in the absorption coefficient of the waveguide layer between the both ends thereof, light is mostly absorbed in the vicinity of the p-type clad layer alone. The present inventors considered that this decreases overlap of the distribution of light in the optical waveguide and its absorption coefficient, which not only incurs an increase in the modulation voltage or in the length of the device but also, when the intensity of incident light increases, leads to local generation of excess carriers, decreasing the electric field intensity in the waveguide and lowering the modulation speed by the space-charge effect. In view of the above, the optical waveguide layers 7, 8 and 9 are each formed to have a size of 0.2 μm in thickness and their energy gaps are selected to be 50, 55 and 60 meV larger than the photon energy hν of 1.55 μm incident light. Incidentally, the optical waveguide layer 2 need not always be the three-layer structure; when the band-gap energy of the layer is varied stepwise, the number of layers used does not matter so long as two or more layers are used. When the band-gap energy is varied continuously, a single layer may also suffice.

Figure 8:
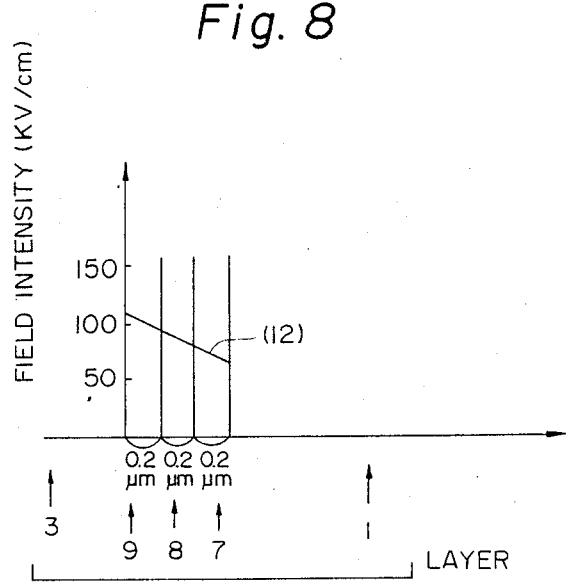
FIGS. 8 and 9 are graphs explanatory of the principle of the present invention.

In FIG. 8 there is indicated by (12) the electric field intensity distribution in the optical waveguide layer in a case where its carrier concentration is $5 \times 10^{15}$ cm$^{-3}$ and a voltage of 4 V is applied to FIG. 8 indicates that when the voltage of 4 V is applied to the optical modulation device, the mean electric field intensities of the optical waveguide layers 7, 8 and 9 are 72 KV/cm, 84 KV/cm and 100 KV/cm, respectively.

In a case where the composition of the optical waveguide layer is the same as in the conventional structure, since the electric field intensity in the optical waveguide layer varies from 65 KV to 110 KV or so, light is absorbed mainly in the vicinity of the optical waveguide layer on the side of the p-InP layer 3, and as described above, the overlap of the absorption coefficient and the distribution of light decreases, resulting in an increase in the modulation voltage and deterioration of the characteristics when the intensity of incident light increases.

Figure 9:
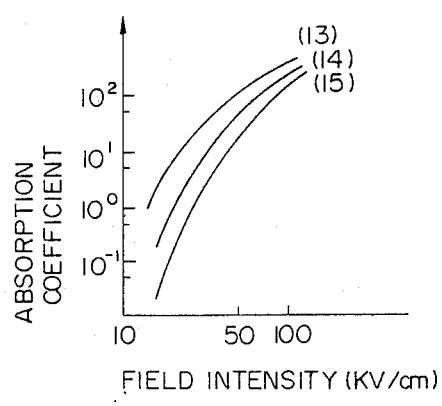

In contrast thereto, according to the present invention, the optical waveguide is formed by a multilayer structure composed of optical waveguide layers (7, 8, 9) of different energy gaps so as to correct varying absorption coefficients of the optical waveguide which are caused by varying electric field intensities therein. FIG. 9 shows the electric field intensity dependence of the absorption coefficients of InGaAsP optical waveguide layers for a 1.55 μm incident light. Curves (13), (14) and (15) indicates absorption coefficients of InGaAsP optical waveguide layers of such compositions that their energy gaps Eg are greater than the photon energy hν of incident light by 40, 50 and 60 meV, respectively. From FIG. 9 it appears that at the mean electric field intensity during the application of 4 V to the optical modulation device the absorption coefficients of the respective layers remain substantially constant at 150 cm$^{-1}$, causing no local absorption of light. Accordingly, the light which is guided through the optical waveguide layers is absorbed on the basis of the constant absorption coefficient; in other words, efficient absorption of light can be achieved. Further, since excessive carriers are not generated locally, an increase in the intensity of incident light will not incur an increase in the modulation voltage and a decrease in the modulation band width.

(Embodiment 4)

Figure 10:
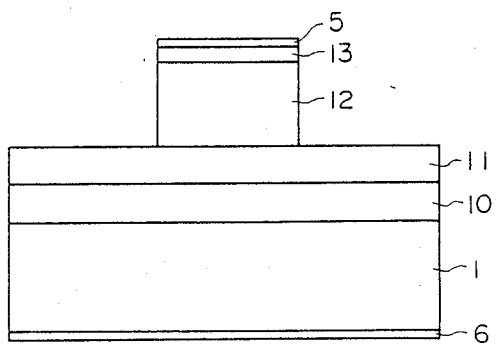
FIG. 10 is a sectional view of a fourth embodiment of the optical modulation device of the present invention.

FIG. 10 is a sectional view of a fourth embodiment of the optical modulation device of the present invention.

Figure 11:
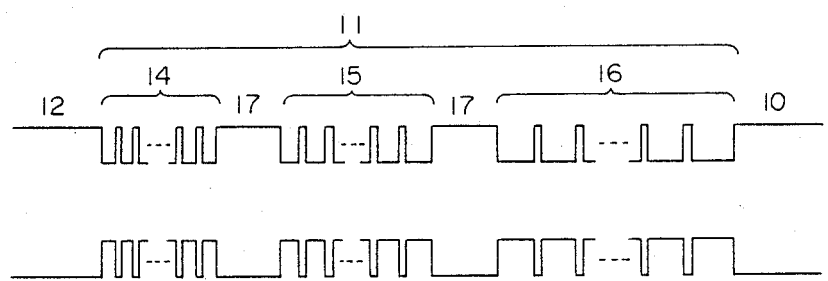
FIG. 11 is a diagram showing the band structure of the fourth embodiment.

The illustrated optical modulation device has a structure in which an n-InAlAs clad layer (20), an n$^-$-InGaAs/n$^-$-InAlAs multiple quantum well (MQW) optical waveguide layer 21, a p-InAlAs clad layer 22 and a p-InGaAs cap layer 23 are laminated on an n-InP substrate 1. FIG. 11 shows in detail the band structure of the MQW optical waveguide layer 21. The MQW optical waveguide layer 21 is composed of three InGaAs/InAlAs MQW layers 24, 25 and 26 of different thicknesses and n$^-$-InAlAs layers 27 for separating them from one another.

The MQW layers 24, 25 and 26 each includes 15 InGaAs well layers and are 70 Å, 75 Å and 80 Å thick, respectively, and the InAlAs barrier layers 27 are each 20 Å thick. The energy gaps of these MQW layers, which are determined by the quantum level, are greater than the energy of the 1.55 μm incident light by 60, 55 and 50 meV, respectively. With a view to preventing overlap of electronic wave functions of the MQW layers 24, 25 and 26, the n$^-$-InAlAs layers 27 of 150 Å in thickness are interposed between the MQW layers 24 and 25 and between 25 and 26, respectively. As is the case with Embodiment 3, this embodiment is also free from the positional nonuniformity of the absorption coefficient which is caused by the varying electric field intensities in the waveguide, so that the overlap of the distribution of light and the absorption coefficient becomes large and the modulation voltage can be decreased. Moreover, the generation of local excess carriers, which presents a problem when high intensity light is incident, can also be suppressed, permitting a high-speed operation regardless of the intensity of incident light.

While in the above the MQW optical waveguide layer is formed by three MQW layers of different well thicknesses, two or more MQW layers will suffice for the optical waveguide layer. Besides, the effective energy gap of the optical waveguide layer composed of NQW layers can be continuously varied by changing the thicknesses of the respective well layers.

Furthermore, the optical waveguide layer is described to be an n$^-$-layer in the above, but when it is p-layer, the same effect as mentioned above could also be produced by use of a multilayer optical waveguide structure in which the energy gap gradually increases from the p-type clad layer to the n-type clad layer.

As described above, according to the present invention, the energy gap of the optical waveguide layer is continuously or discontinuously varied in the direction of its thickness so that the absorption coefficient of the waveguide layer is substantially constant in the direction of its thickness, thereby permitting low-voltage, high-speed modulation even if the intensity of incident light increases.

Although in the above the present invention has been described in connection with the case of using materials of the InGaAsP/InP and the InGaAs/InAlAs series, the invention is also applicable to other materials such as those of the AlGaAs/GaAs series. Further, the stripe structure for stabilizing the transverse mode has been described to be strip-loaded planar waveguide type, but a buried stripe structure, a ridge waveguide stripe structure and similar conventional structures are all applicable.

As described above, according to the second feature of the present invention, the optical modulation element has a structure in which the band-gap energy of the optical waveguide layer is varied thickwise thereof so as to correct the nonuniformity of the absorption coefficient of the optical modulation device which is caused by nonuniformity of the electric field intensity therein. Accordingly, the overlap of the absorption coefficient and the distribution of light becomes large, decreasing the modulation voltage. Moreover, even if high intensity light is incident, there is no fear of excess carriers being generated locally, so that the characteristics of the optical modulation device will not be degraded.

The fabrication of the optical modulation device is facilitated by forming the optical waveguide layer with a plurality of layers of different band-gap energies. A waveguide loss can be decreased by forming the optical waveguide layer with a plurality of multiple quantum well layers.

Furthermore, by changing the composition of the optical waveguide layer to continuously vary the band-gap energy, the absorption coefficient of the optical waveguide layer can be controlled to be substantially constant in the direction of its thickness.

By forming the optical waveguide layer with a multiple quantum well layer in which the thickness of wells is changed well by well, the waveguide loss can be reduced and the absorption coefficient of the optical waveguide layer can be controlled to be substantially constant in the direction of its thickness.

Accordingly, an optical modulation device capable of low-voltage, high-speed operation can be obtained, which is applicable to ultra-high speed fiber optic communication or the like, and hence is of great utility.

The present invention will be hereinafter be described in detail in connection with the third, fourth and fifth features thereof.

As a result of close studies of phenomena which are observed when the intensity of incident light increases, such as an increase in the modulation voltage and the reduction of the modulation band width, it has been found out that the above phenomena largely depend on the energy difference ($\Delta Eg = Eg - h\nu$) between the band-gap energy Eg of the optical waveguide layer and the photon energy $h\nu$ of incident light and occur when the energy differencce $\Delta Eg$ is less than 50 meV. As regards the dependence of such characteristics on the length of the device, it is described above with reference to FIGS. 2 to 6 that even if the length of the device is changed in the range of from 0.3 to 2.5 mm, the characteristics are still deteriorated when the energy difference $\Delta Eg$ is in the range of between 30 to 40 meV.

The above experimental results reveal that when the intensity of incident light is high, a space-charge effect is produced by an excess carrier only in a very narrow area near the light receiving end of the device where the light intensity is very high, thereby lowering the electric field intensity and decreasing the modulation rate. As a possible means for suppressing the space-charge effect by the excess carrier there is described above with reference to FIGS. 7 to 11, a structure in which the band-gap energy of the optical waveguide layer is varied continuously or discontinuously thicknesswise thereof for compensating for the variation of the absorption coefficient caused by the nonuniform electric field distribution in the direction of the thickness of the optical waveguide layer (in the direction in which voltage is applied). In the following, a description will be given of another means for suppressing the space-charge effect to permit low-voltage, high-speed modulation.

Letting the intensity of light incident to the optical modulation device, the absorption coefficient and the light confinement factor of the optical waveguide be represented by $I_{(0)}$, $\alpha$ and $\Gamma$, respectively, the light intensity $I_{(x)}$ at a distance x from the light receiving end face can be expressed as follows:

$$I_{(x)} = I_0 e^{-\alpha \Gamma x} \quad (1)$$

and the quantity of light absorbed per unit length is as follows:

$$\frac{\alpha I_{(x)}}{\alpha x} = -\alpha \Gamma I_{(x)} \quad (2)$$

Eq. (2) is a proportion to the number of carriers absorbed per unit length. That is, in the conventional optical modulation device, since $\alpha$ and $\Gamma$ are constant, the number of carriers absorbed per unit length is substantially in proportion to $I_{(x)}$, and in the vicinity of the light receiving end the number of carriers absorbed is abnormally large as compared with the number of carriers absorbed near the light emitting end. Where the intensity of incident light is low, such a local variation in the number of carriers absorbed does not affect the band structure, and hence does not matter. When the intensity of incident light is high, however, excess carriers absorbed near the light receiving end cancel the applied electric field, exerting influence on the modulation voltage and the modulation rate.

In view of the above, the present inventors considered that efficient optical modulation could be achieved, without generating the excess carrier locally, by a structure in which $\alpha \Gamma I_{(x)}$ in eq. (2) remains substantially constant and substantially the same number of carriers are absorbed at any places in the optical waveguide layer from the light receiving end to the light emitting end thereof. In other words, by selecting the absorption coefficient $\alpha$ or light confinement factor $\Gamma$ small at places where the quantity of light is large and selecting the absorption coefficient $\alpha$ or light confinement coefficient $\Gamma$ large at places where the quantity of light is small, it is possible to obtain a high performance optical modulation device which is free from the degradation of the modulation band and an increase in the modulation voltage.

(Embodiment 5)

Figure 12:
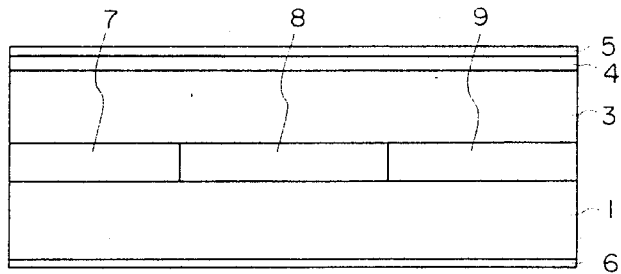
FIGS. 12, 13 and 14 are side views illustrating the structures of fifth, sixth and seventh embodiments of the optical modulation device of the present invention.

FIG. 12 is a side view of a fifth embodiment of the optical modulation device of the present invention. This optical modulation device differs from the conventional structure in that the optical waveguide layer is not a homogeneous region but is split into three n⁻-InGaAsP optical waveguide layers 37, 38 and 39 whose band-gap energies decrease toward the light emitting end from the light receiving end. The optical waveguide layer is of 0.45 μm in thickness and the waveguide layers are each 200 μm long. The band-gap energy of the optical waveguide layer 37 at the side of the light receiving end is selected 60 meV greater than the photon energy of 1.55 μm incident light, and the band-gap energies of the optical waveguide layers 38 and 39 are selected 55 and 50 meV larger, respectively. When the stripe width is 3 μm, the mean electric field intensity in the waveguide layer is 72 KV/cm and the absorption coefficients $\alpha$ of the optical waveguide layers 37, 38 and 39 are 50, 100 and 150 cm$^{-1}$, respectively, in a case where the light confinement coefficient $\Gamma$ is nearly equal to 0.77 and 2 V is applied. Since the absorption coefficient of the optical waveguide layer 37 at the side of the light receiving end is small, there is no possibility of generating excess carriers locally near the light receiving end and producing the space-charge effect. Further, when light enters the light waveguide layers 38 and 39, its intensity has already decreased to 46 and 10%, respectively, so that even if the absorption coefficients of these layers are large, the numbers of carriers absorbed therein will not increase.

According to the above structure of the present invention, when the modulation voltage is 2V, the extinction ratio at the light emitting end is as large as 20 dB or more and the modulation band width is about 10 GHz, implementing a high performance optical modulation device which is free from the degradation of its characteristics when the intensity of incident light is high.

(Embodiment 6)

Figure 13:
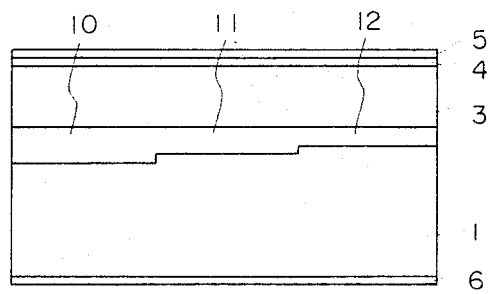

FIG. 13 is a side view of a sixth embodiment of the optical modulation device of the present invention. In Embodiment 5 the composition of the optical waveguide layer is varied toward the light emitting end from the light receiving end thereof to thereby increase the absorption coefficient, whereas in this embodiment the thickness of the optical waveguide layer is changed to vary the electric field intensity therein, thereby increasing the absorption coefficient. The band-gap energies of n−-InGaAsP optical waveguide layers 40, 41 and 42 are each selected 55 meV greater than the photon energy of 1.55 μm incident light. The stripe width is 3 μm and the waveguide layers 40, 41 and 42 are each 200 μm long as in Embodiment 5. The optical waveguide layers 40, 41 and 42 are 0.7, 0.45 and 0.4 μm thick, respectively; the electric field intensities in these layers at the time of applying 2 V are selected 45, 72 and 80 KV/cm, respectively; and the coefficients of the waveguide layers 40, 41 and 42 are selected 50, 100 and 150 cm$^{-1}$, respectively. Considering the varying light confinement coefficients $\Gamma$=0.89, 0.77 and 0.73 in the optical waveguide layers 40, 41, and 42, the intensities of light incident to the optical waveguide layers 41 and 42 become 44 and 9%, respectively and the extinction ratio at the light emitting end is around 20 dB when the modulation voltage is 2 V. Also in the structure of this embodiment, the absorption coefficient is small in the vicinity of the light receiving end where the quantity of light is large and the quantity of light is small in the vicinity of the light emitting end where the absorption coefficient is large, so that no excess carrier is generated locally and the characteristics of the optical modulation device are not degraded when high intensity light is applied, as in Embodiment 5.

(Embodiment 7)

Figure 14:
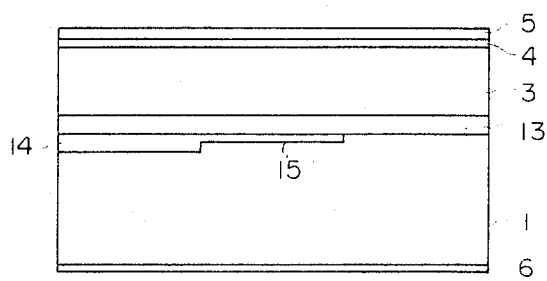

FIG. 14 is a side view of a seventh embodiment of the optical modulation device of the present invention. As is the case with Embodiment 6, this embodiment also varies the absorption coefficient by changing the electric field intensity. This embodiment differs from Embodiment 6 in that an n−-InGaAsP optical waveguide layer 53 is 0.4 μm thick along the entire length thereof and that n−-InP layers 54 and 55 of different thicknesses are sandwiched between the InGaAsP optical waveguide layer 53 and the InP substrate 1, thereby varying the electric field intensity in the waveguide layer. By forming the n−-InP layers 54 and 55 to thicknesses of 0.3 and 0.05 μm, respectively, it is possible to produce the same effect as that obtainable with Embodiment 6 and implement an optical modulation element which is free from the degradation of its characteristics when the intensity of incident light is high.

(Embodiment 8)

Figure 15:
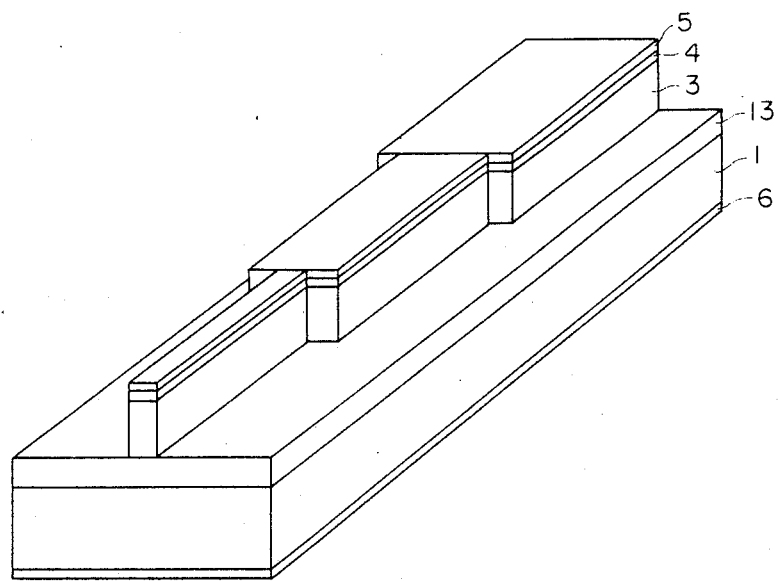
FIG. 15 is a schematic diagram of a eighth embodiment of the optical modulation device of the present invention.

FIG. 15 is a schematic diagram of an eighth embodiment of the optical modulation device of the present invention.

The energy gap and thickness of the n−-InGaAsP optical waveguide layer 63 are the same as in Embodiment 7. This embodiment varies the absorption coefficient toward the light emitting end from the light receiving end by changing the stripe width so that the light confinement factor varies accordingly.

The stripe width is selected 1, 2 and 4 μm in three regions defined in the direction from the light receiving end to the light emitting end, respectively, providing varying light confinement factors $\Gamma$ of 0.48, 0.73 and 0.84. The effective absorption coefficients at the time of applying 2 V are 48, 73 and 86 cm$^{-1}$ in the regions where the stripe widths are 1, 2 and 4 μm. Where these regions are 150, 200 and 250 μm long, the intensities of light incident to the regions of 2 and 4 μm stripe widths are 48 and 11% of the light intensity at the light receiving end, respectively. As is the case with Embodiment 7, it is possible to obtain a high performance optical modulation device which is free from degradation of its characteristics even when high intensity light is incident thereto.

Although in the above the present invention has been described in connection with the case where the absorption coefficient of the optical waveguide is greatly increased stepwise in three steps toward the light emitting end from the light receiving end, the invention is also applicable to a structure in which the absorption coefficient is varied in two or more steps or continuously. It is also possible to combine two or more of the optical modulation devices of Embodiments 5 to 8 described above.

Next, a combination of the optical modulation device of the present invention with those proposed in connection with the afore-mentioned first and second features thereof will be described as another embodiment of the present invention.

Before entering into the description of a specific operative example of such a combination, the optical modulation devices described in the first and second features herewith will be outlined.

The point of the optical modulation device of the first feature lies in that the energy difference ΔEg (=Eg−hν) between the band-gap energy Eg of the optical waveguide layer and the photon energy hν of indicent light is 50 meV or more and that the optical modulation device is formed to a predetermined length. In the case of combining the present invention with this optical modulation device, the energy difference ΔEg differs between the light receiving end face side and the light emitting end face side because the band-gap energy is varied in the direction of the thickness of the optical waveguide layer or in the direction from the light receiving end face to the light emitting end face in the present invention, but the condition that the averaged energy difference ΔEg becomes 50 meV or more needs only to be fullfilled.

The point of the optical modulation device of the second feature lies in that the band-gap energy of the optical waveguide layer is varied continuously or discontinuously thickwise thereof for compensating for the variation of the absorption coefficients induced by uniformity of the electric field intensity into direction of thickness to be constant in the direction of its thickness, by which overlap of the distribution of light and the absorption coefficient is increased so as to decrease the modulation voltage and broaden the modulation band width by the reduction of the length of the optical modulation device. At the same time, the uniform absorption coefficient suppresses the space-charge effect which is caused by the local excess carrier which presents a problem when high intensity light is incident to the optical modulation device.

Accordingly, if the optical modulation device of the present invention is referred to as an optical modulation device of the third feature, then a combination of the first feature with the second feature, a combinations of the first feature with the third feature, a combination of the second feature with the third feature, and a combination of the first and second features with the third feature, that is, four kinds of combinations can be achieved.

A description will hereinbelow be given of the combination of the first, second and third optical modulation devices.

(Embodiment 9)

Figure 16:
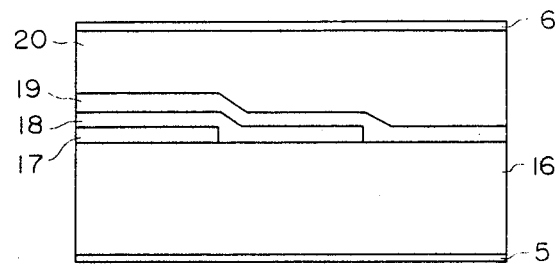
FIG. 16 is a side view of a nineth embodiment of the optical modulation device of the present invention.

FIG. 16 is a side view of a nineth embodiment of the present invention.

On a p-InP substrate 76 an n⁻-InGaAsP optical waveguide layer (0.2 μm thick) 77 whose band-gap energy is 60 meV greater than the energy of incident light is formed over a region 200 μm long and then an n⁻-InGaAsP optical waveguide layer (0.2 μm thick) 78 of a band-gap energy which provides the energy difference ΔEg of 55 meV is formed over a region 400 μm long. Further, an n⁻-InGaAsP optical waveguide layer 79 of a band-gap energy which provides the energy difference ΔEg of 50 meV is formed over a region 600 μm long, and finally an n-InP clad layer 80 is laminated on the above optical waveguide layers. That is, this embodiment is a combination of the optical modulation device of the third feature with the optical modulation devices of first and second features. The optical modulation device of this embodiment has a structure in which varying absorptions of the optical waveguide by varying electric field intensities in the direction of its thickness (i.e. in the direction in which voltage is applied to the device) is corrected to provide a constant absorption coefficient thickwise of the optical waveguide, the thickness (and consequently the electric field intensity) and the composition of the optical waveguide is changed so that the absorption coefficient of the waveguide increases toward the light emitting end from the light receiving end thereof to perform uniform absorption of light in the lengthwise direction of the waveguide, and the energy gaps of the optical waveguide layers 77, 78 and 79 are all 50 meV or more greater than the photon energy (hν) of incident light. Accordingly, the optical modulation device of this embodiment is adapted for uniform absorption of light almost throughout its light absorbing region and is capable of high-speed, low-voltage modulation even when the intensity of incident light is high.

While Embodiment 9 has been described as the combination of the first, second and third optical modulation devices, the other three kinds of combinations can also be achieved.

The conductivity type of the optical waveguide layer may also be the p⁻-type. Although the present invention has been described in connection with the case of using materials of the InGaAsP/InP series, the invention is also applicable to other materials such as those of the AlGaAs/GaAs and the AlGaAs/InP systems. It is also possible to employ a multiple quantum well layer of such materials, in which case the energy gap described above becomes an effective energy gap which is determined by the quantum level. Moreover, the stripe structure for stabilizing the transverse mode has been described to be a strip load planar waveguide type, but a buried stripe structure, a ridge waveguide stripe structure and similar conventional ones are all applicable.

As described above, according to the present invention of the third to fifth features, the absorption coefficient is small at the side of the light receiving end where the quantity of light is large but the absorption coefficient is large at the side of the light emitting end so that the number of carriers absorbed per unit length is constant. Accordingly, an increase in the intensity of incident light will not lead to the generation of local excess carriers which causes an increase in the modulation voltage and a decrease in the modulation band width; therefore, a high performance optical modulation device capable of low-voltage, high-speed modulation can be realized. By varying the energy gap of the optical waveguide continuously or discontinuously thicknesswise thereof to provide a constant absorption coefficient in that direction, in addition to increasing the absorption coefficient toward the light emitting end face from the light receiving end face, the optical modulation device can perform low-voltage, high-speed modulation. Further, by making the band-gap energy of the optical waveguide layer on the average 50 meV or more greater than the photon energy of incident light, in addition to increasing the absorption coefficient toward the light emitting end face from the light receiving end face and varying the band-gap energy of the optical waveguide layer in the direction of its thickness, it is possible to perform high-speed modulation at a lower voltage.

Besides, the method of decreasing the band-gap energy of the optical waveguide layer for increasing its absorption coefficient toward the light emitting end face from the light receiving end face produces an effect of precise and accurate control of the absorption coefficient, and the method of gradually decreasing the thickness of the optical waveguide layer and the method of gradually increasing its stripe width have a merit of making the fabrication of the optical modulation device easy. This optical modulation device can be applied to ultra-high speed, long distance fiber optic communication or the like, and hence is of great utility.

What we claim is:

1. An optical modulation device which has, on a substrate, an optical waveguide layer, p- and n-type clad layers smaller in refractive index than that of the optical waveguide layer, and electrodes, and in which fixed-intensity light incident on a light receiving end face of the optical waveguide layer is modulated by changing its absorption coefficient for the incident light by an electric field which is applied to the optical waveguide layer across the electrodes and the modulated light is emitted from an emitting end face of the optical waveguide layer, characterized in:

that when the intensity of the light incident on the optical waveguide layer is above 0.1 mW, the band-gap energy of the optical waveguide layer is 50 meV or more greater than the photon energy of the incident light, and that a ratio of the energy difference between the band-up energy and the photon energy to the length of the optical modulation device, which is determined by the length from the light receiving end face to the emitting end face of the optical waveguide layer, is larger than 10 meV/mm but smaller than 250 meV/mm.

2. An optical modulation device which has, on a substrate, an optical waveguide layer, p- and n-type clad layers smaller in refractive index than that of the optical waveguide layer, and electrodes, and in which fixed-intensity light incident to a light receiving end face of the optical waveguide layer is modulated by changing its absorption coefficient for the incident light by an electric field which is applied to the optical waveguide layer across the electrodes and the modulated light is emitted from an emitting end face of the optical waveguide layer, characterized in:

that when the intensity of the light incident to the optical waveguide layer is above 0.1 mW, the band-gap energy of the optical waveguide layer is 50 meV or more greater than the photon energy of the incident light, that a ratio of the energy difference between the band-gap energy and the photon energy to the length of the optical modulation device, which is determined by the length from the light receiving end face to the emitting end face of the optical waveguide layer, is larger than 10 meV/mm but smaller than 250 meV/mm, and that a semiconductor layer of the same conductivity type as the optical waveguide layer is sandwiched between it and the p-type clad layer, the semiconductor layer having a band-gap energy larger than the band-gap energy of the optical waveguide layer but smaller or equal to the band-gap energy of each of the clad layers.

3. An optical modulation device which has, on a substrate, an optical waveguide layer, p- and n-type clad layers smaller in refractive index than that of the optical waveguide layer, and electrodes, and in which fixed-intensity light incident on a light incident end face of the optical waveguide layer is modulated by changing its absorption coefficient for the incident light by an electric field which is applied to the optical waveguide layer thickwise thereof across the electrodes and the modulated light is emitted from an emitting end face of the optical waveguide layer, characterized in:

that the band-gap energy of the optical waveguide layer in its thicknesswise direction is varied continuously or discontinuously so that the absorption coefficient of the optical waveguide layer is substantially constant thicknesswise thereof.

4. An optical modulation device according to claim 3, characterized in that the optical waveguide layer is formed by a plurality of layers of different energy gaps.

5. An optical modulation device according to claim 3, characterized in that the optical waveguide layer is formed by a plurality of multiple quantum well layers, the thicknesses of well layers of each multiple quantum well layer varing discontinuously.

6. An optical modulation device according to claim 3, characterized in that the composition of the optical waveguide layer in its thickness direction varies so that its band-gap energy varies continuously.

7. An optical modulation device according to claim 3, characterized in that the optical waveguide layer is formed by a multiple quantum well layer composed of well layers of different thicknesses.

8. An optical modulation device which has, on a substrate, a low impurity concentration optical waveguide layer of a first conductivity type, clad layers smaller in refractive index than that of the optical waveguide layer and having the first and second conductivity types, respectively, and electrodes, and in which fixed-intensity light incident on a light receiving end face of the optical waveguide layer is intensity modulated by changing its absorption coefficient for the incident light by an electric field which is applied to the optical waveguide layer across the electrodes and the modulated light is emitted from a light emitting end face of the optical waveguide layer, characterized in:

that the optical waveguide layer is formed so that its absorption coefficient for the incident light increases continuously or discontinuously toward the light emitting end face from the light receiving end face so as to produce substantially the same number of photo-absorbed carriers in the optical waveguide layer at any place between the light receiving and light emitting end faces.

9. An optical modulation device which has, on a substrate, a low impurity concentration optical waveguide layer of a first conductivity type, clad layers small in refractive index than that of the optical waveguide layer and having the first and second conductivity types, respectively, and electrodes, and in which fixed-intensity light incident to a light receiving end face of the optical waveguide layer is intensity modulated by changing its absorption coefficient for the incident light by an electric field which is applied to the optical waveguide across the electrodes and the modulated light is emitted from a light emitting end face of the optical waveguide layer, characterized in:

that the optical waveguide layer is formed so that its absorption coefficient for the incident light increases continuously or discontinuously toward the light emitting end face from the light receiving end face so as to produce substantially the same number of photo-absorbed carriers in the optical waveguide layer at any places between the light receiving and light emitting end faces and so that the band-gap energy of the optical waveguide layer varies continuously or discontinuously in the direction of its thickness so as to make the absorption coefficient substantially constant in that direction.

10. An optical modulation device which has, on a substrate, a low impurity concentration optical waveguide layer of a first conductivity type, clad layers smaller in refractive index than that of the optical waveguide layer and having the first and second conductivity types, respectively, and electrodes, and in which fixed-intensity light incident on a light receiving end face of the optical waveguide layer is intensity modulated by changing its absorption coefficient for the incident light by an electric field which is applied to the optical waveguide layer across the electrodes and the modulated light is emitted from a light emitting end face of the optical waveguide layer, characterized in:

that the optical waveguide layer is formed so that its absorption coefficient for the incident light increases continuously or discontinuously toward the light emitting end face from the light receiving end face so as to produce substantially the same number of photo absorbed carriers in the optical waveguide layer at any places between the light receiving and light emitting end face and so that the band-gap energy of the optical waveguide layer varies continuously or discontinuously in the direction of its thickness so as to make the absorption coefficient substantially constant in that direction; and that the band-gap energy gap of the optical waveguide layer is on the average 50 meV or more greater than the photon energy of the incident light.

11. An optical modulation device according to claim 8, 9 or 10, characterized in that the band-gap energy of the optical waveguide layer decreases continuously or discontinuously toward the light emitting end face from the light receiving end face so that substantially the same number of photo-absorbed carriers are produced in the optical waveguide layer at any places between the light receiving and light emitting end faces.

12. An optical modulation device according to claim 8, 9 or 10, characterized in that the thickness of the optical waveguide layer is decreases continuously or discontinuously toward the light emitting end face from the light receiving end face so that substantially the same number of carriers are absorbed in the optical waveguide layer at any places between the light receiving and light emitting end faces.

13. An optical modulation device according to claim 8, 9 or 10, characterized in that the stripe width of the optical waveguide layer increases conntinuously or discontinuously toward the light emitting end face from the light receiving end face so that substantially the same number of photo-absorbed carriers are produced in the optical waveguide layer at any places between the light receiving and light emitting end faces.

14. An optical modulation device according to claim 8, 9 or 10, characterized in that one of the clad layers is formed in a low impurity concentration and the thickness of the low impurity concentration clad layer decreases continuously or discontinuously toward the light emitting end face from the light receiving end face so that substantially the same number of photo-absorbed carriers are produced in the optical waveguide layer at any places between the light receiving and light emitting end faces.

* * * * *